(12) United States Patent
Uenoyama (10) Patent No.: US 6,924,639 B2
(45) Date of Patent: Aug. 2, 2005

(54) POSITION DETERMINATION DEVICE USING MAGNETORESISTIVE ELEMENT

(75) Inventor: Hirofumi Uenoyama, Nishikasugai-gun (JP)

(73) Assignee: Denso Corporation, Kariya (JP)

( * ) Notice: Subject to any disclaimer, the term of this patent is extended or adjusted under 35 U.S.C. 154(b) by 290 days.

(21) Appl. No.: 10/387,550

(22) Filed: Mar. 14, 2003

(65) Prior Publication Data

US 2003/0173955 A1 Sep. 18, 2003

(30) Foreign Application Priority Data

Mar. 18, 2002 (JP) ........................................ 2002-073964

(51) Int. Cl.$^7$ .............................................. G01B 7/30
(52) U.S. Cl. .............................. 324/207.1; 324/207.25
(58) Field of Search ....................... 324/207.21, 207.22, 324/207.25, 174, 252, 207.24; 338/32 R; 702/145, 151

(56) References Cited

U.S. PATENT DOCUMENTS

| 4,506,217 A | 3/1985 | Rothley et al. |
| 5,538,481 A | 7/1996 | Friedmann |
| 5,796,249 A | 8/1998 | Andräet al. |
| 6,366,079 B1 | 4/2002 | Uenoyama |
| 6,452,381 B1 | 9/2002 | Nakatani et al. |

FOREIGN PATENT DOCUMENTS

| GB | 2 355 077 | 4/2001 |
| JP | B2-58-56408 | 12/1983 |
| JP | B2-H1-40510 | 8/1989 |
| JP | B2-2-11022 | 3/1990 |
| JP | A-3-191821 | 8/1991 |
| JP | H8-204252 | 8/1996 |
| JP | H11-271094 | 10/1999 |

*Primary Examiner*—Jay Patidar
(74) *Attorney, Agent, or Firm*—Posz Law Group, PLC (57) ABSTRACT

In a position detecting device for a rotor, such as a camshaft gear, a magnet sensor is constructed of first, second, third, and fourth MRE bridges. The bridges are positioned symmetric to a magnetic axis of a bias magnet. The third bridge is arranged at a midpoint between the first bridge and the magnetic axis. The fourth bridge is arranged at a midpoint between the second bridge and the magnetic axis. Outputs of the bridges are inputted to a differential amplifier circuit to obtain a single differential output. A position of the rotor is determined based on the differential output, regardless of gear-teeth shapes of the rotor.

7 Claims, 7 Drawing Sheets

GEAR ROTATION (TIME)

POSITION DETERMINATION DEVICE USING MAGNETORESISTIVE ELEMENT

CROSS REFERENCE TO RELATED APPLICATION

This application relates to and incorporates herein by reference Japanese Patent Application No. 2002-73964 filed on Mar. 18, 2002.

FIELD OF THE INVENTION

The present invention relates to a position determination device for determining position of a moving body by the use of a magnetoresistive element (MRE), and particularly to a rotation detecting device used for engine control or braking control in a vehicle.

BACKGROUND OF THE INVENTION

The ignition timing of an engine is determined based on a crankshaft position and a camshaft position. For example, a camshaft of a four-stroke engine attains one rotation for every two rotations of a crankshaft. Therefore, cylinder identifying information is provided within one rotation of the camshaft and ignition timing information is provided in one rotation of the crankshaft.

Conventional position detecting devices use MREs for a determination of a rotor position. In the devices, a bias magnetic field is projected by a bias magnet toward a rotor. The direction of the bias magnetic field changes as the rotor position changes associated with rotation of the rotor. Therefore, the rotor position is determined based on the changes of the direction of the bias magnetic field. However, immediately after the rotor starts rotating, an accurate rotor position cannot be determined until the direction of the bias magnetic field changes. Thus, the first cylinder determination based on the rotor position cannot be performed, and an ignition is not performed at the first ignition timing.

Figure 13:
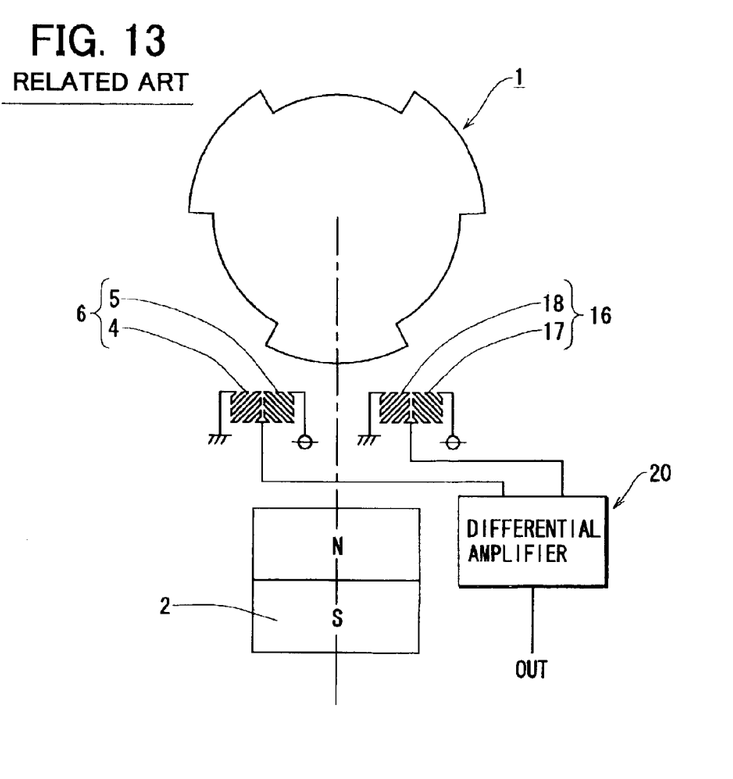
FIG. 13 is a schematic diagram showing a position detecting device according to a related art.

To solve this problem, a position detecting device 1 that detects a rotor position even when the rotor is at a halt is invented and disclosed in JP-A-11-237256. The position detecting device 1 includes two MRE bridges as shown in FIG. 13. The MRE bridges 6, 16 are composed of a first pair of MREs 4, 5 and a second pair of MREs 17, 18 connected in series, respectively.

The MREs 4, 5, 17, 18 are arranged so that their sensing axes are at angles of 45° and −45° with respect to a magnetic center of a bias magnetic field. With this configuration, changes in voltages at respective connecting points of the first pair and the second pair, in response to changes of the magnetic field direction, become more significant.

Output voltages of the MRE bridges 6, 16 are inputted to and amplified by the differential amplifier circuit 20. The differential output of the circuit 20 corresponds to a deflection angle of the bias magnetic filed. The MRE bridges 6, 16 are positioned off magnetic center of the bias magnet field. As a result, different output is obtained in each case that a gear-tooth of the rotor is adjacent to or away from the bridges 6, 16. Therefore, the rotor position is determined even when the rotor is at a halt.

Figure 15:
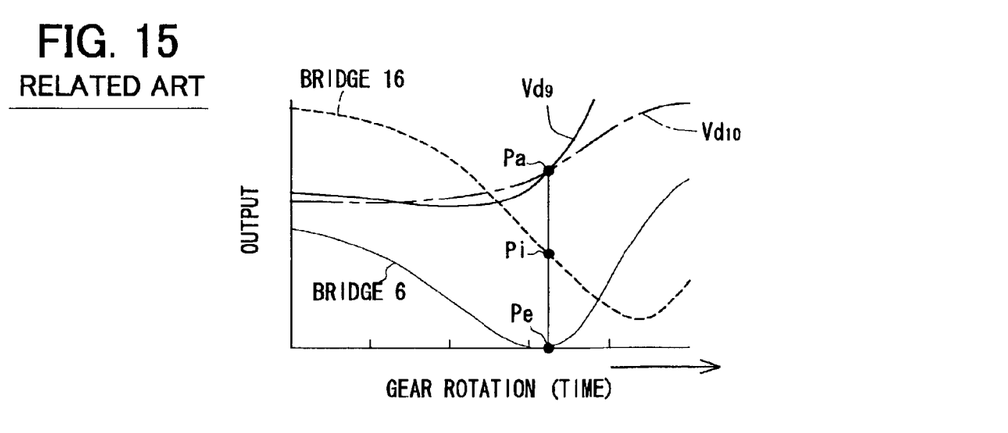
FIG. 15 is a time chart showing outputs of the MRD bridges and the differential amplifier.

However, the output of the circuit 20 varies according to a gear-teeth shape, which changes an air gap between the rotor and the MRE bridges 6, 16. To perform accurate determination of the rotor position, a threshold is provided for binarizing the output of the circuit 20. The threshold is defined based on a minimum point of air gap (AG) characteristic curves. At the minimum point, the output of the circuit 20 is always equal regardless of the size of the air gap if the rotor position is equal as shown in FIG. 15.

In the device 1, the output at the minimum point varies according to the gear-teeth shape. As a result, an accuracy of the rotor position determination decreases if a single threshold is used. To provide accurate rotor position determination, different threshold values need to be set for rotors having different gear-teeth shapes. This creates heavy workload.

SUMMARY OF THE INVENTION

It is therefore an object of the present invention to provide a position detecting device that detects a rotor position without any modification for rotor having different shapes of gear-teeth. A position detection device of the present invention includes a rotor, a bias magnet, a magnetic sensor, and a differential output calculation circuit.

The rotor has gear-teeth on its periphery. The bias magnet project a bias magnetic field toward the gear-teeth. The magnetic sensor includes at least four magnetoresistive element (MRE) bridges, outputs of which vary according to the direction of the bias magnetic field. The magnetic sensor is located between the gear-teeth and the bias magnet.

The differential output calculation circuit produces a single differential output via multistage calculations from the outputs of the MRE bridges. The single differential output is substantially constant at the minimum point of the AG characteristic curves regardless of shapes of the gear-teeth. Therefore, positions of rotors having different shapes of gear-teeth are determined based on the differential output.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings. In the drawings, the same numerals are used for the same components and devices.

[First Embodiment]

Figure 1:
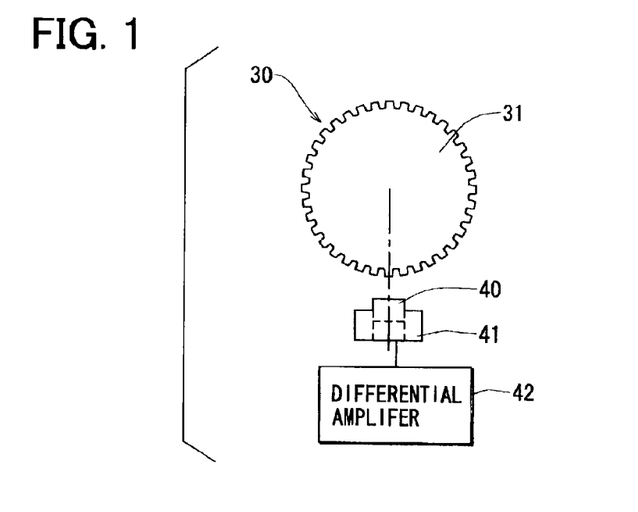
FIG. 1 is a schematic diagram showing a position detecting device with a rotor according to a first embodiment of the present invention.

Referring to FIG. 1, a position detecting device 30 includes a rotor 31, an IC chip 40, and a bias magnet 41. The rotor 31 has gear-teeth on its outer periphery and faces the bias magnet 41, an axis of which faces a rotary axis of the rotor 31. The IC chip 40 having four magnetoresistive element (MRE) bridges is a magnetic sensor.

The bias magnet 41 has a hole around its central axis, which is also a magnetic center of a bias magnetic field, and a first and a second ends. The first end is located adjacent to the rotor 31 and magnetized to a north pole. The second end is located away form the rotor 31 and magnetized to a south pole. The first and the second ends can be magnetized the other way around.

Figure 2:
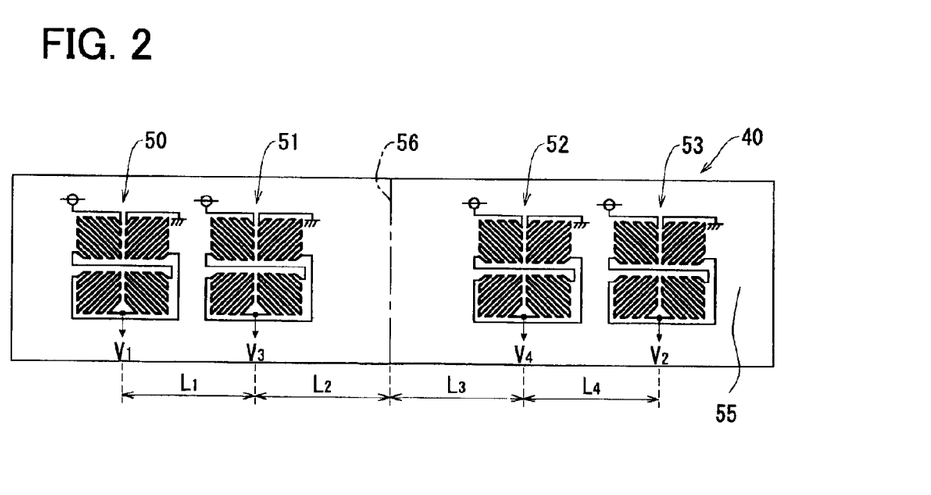
FIG. 2 is a schematic diagram showing an IC chip included in the position detecting device shown in FIGS. 1 and 3.

The IC chip 40 is constructed of four MRE bridges 50, 51, 52, 53 arranged on a substrate 55 as shown in FIG. 2. Although it is not shown in figures, the IC chip 40 is mounted on a lead frame made of copper or other kinds of metals, and molded with a thermoset resin, such as an epoxy resin. A part of the IC chip 40 is placed in the hole of the bias magnet 41 at a position that a centerline of the substrate 55 matches the central axis of the bias magnet 41.

The MRE bridges 50, 53 are arranged symmetric with respect to the centerline 56. The MRE bridges 51, 52 are arranged symmetric with respect to the centerline 56. The MRE bridge 51 is located at a midpoint between the MRE bridge 50 and the centerline 56, and the MRE bridge 52 is located at a midpoint between the MRE bridge 53 and the centerline 56. Therefore, the distances L1, L2, L3, L4 between the MRE bridges 50 and 51, the MRE bridge 51 and the centerline 56, the centerline 56 and the MRE bridge 52, and the MRE bridges 52 and 53, respectively, are all equal (L1=L2=L3=L4).

Figure 3A:
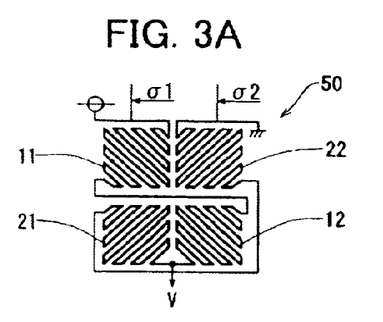
FIG. 3A is a schematic diagram showing one of MRE bridges included in the position detecting device shown in FIGS. 1 and 3.
Figure 3B:
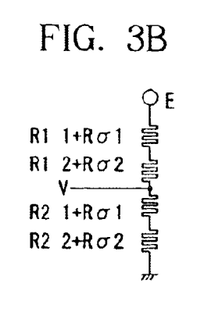
FIG. 3B is a circuit diagram showing wiring of the MRE bridge shown in FIG. 6A.

Referring to FIGS. 3A and 3B, the MRE bridge 50 includes four MREs 11, 12, 21, 22 provided in comb like patterns on the substrate 55. The MREs 11, 12, 21, 22 are constructed of ferromagnetic materials with anisotropic magnetoresistance, such as a NiCo alloy and a NiFe alloy. Variations in resistance across long lines of the MRE patterns are larger than those in across short lines of the MRE patterns. Therefore, sensing axes of the MREs 11, 12, 21, 22 are defined along the long lines of the MRE patterns. In the MRE bridge 50, lengths and numbers of long lines and short lines are all the same although the MREs 11, 12, 21, 22 are arranged differently.

The MREs 11, 12, 21, 22 are arranged in matrix on the substrate 55. The first column of the MRE bridge 50 includes the MREs 11 and 21, and the second column includes the MREs 12 and 22. The MREs 11, 12, 21, 22 are positioned so that the first and the second columns are parallel to a magnetic axis of the bias magnet 41. On the other hand, the first row includes the MREs 11 and 22, and the second row includes the MREs 12 and 21. The rows are parallel to the rotary axis of the rotor 31.

The sensing axes of the MREs 11 and 12 form approximately 45° with the magnetic axis, and the sensing axes of the MREs 21 and 22 form approximately −45° with the magnetic axis. Therefore, the sensing axes of the MREs 11 and 12 are orthogonal to the sensing axes of the MREs 21 and 22. In other words, the resistance across the sensing axes of the MREs 11 and 12 changes as the direction of the magnetic field changes differently from the one that across the sensing axes of the MREs 21 and 22.

The MREs 11, 12, 21, 22 are electrically connected in series between the power source and the ground in that order. The output of the MRE bridge 50 is measured at the midpoint between the MREs 12 and 21, and referred to as a midpoint voltage V1. The MREs 11, 12, 21, 22 can be arranged in the opposite order. The output of the MRE bridge 50 is measured at the connecting point of the MRE 12 and the MRE 21, which is a midpoint voltage V1.

Since the IC chip 40 and the lead frame are molded with thermoset resins, external forces are applied to different parts of the IC chip 40. When the lead frame is set in a die that is heated up to 150° C. to 160° C. for molding, the lead frame expands more than the IC chip that is made of silicon. When the lead frame is cooled down to the room temperature, shrinkage stresses that result from shrinkage of the lead frame are applied to the IC chip 40 as external forces.

The external forces are usually larger with the distance from the centerline 56. Therefore, the strength of the external forces is approximately equal at the points where the distance from the centerline 56 is equal. When the external force applied to the MREs 11, 21 is 0.1, the resistance across the MREs 11, 21 will change by the amount of R.1 as shown in FIG. 3B. In the same manner, when the external force applied to the MREs 12, 22 is 0.2, the resistance across the MREs 12, 22 will change by the amount of R.2.

When resistances of the MREs 11, 12, 21, 22 are R11, R12, R21, and R22, respectively, and a voltage applied to the MRE bridge 50 is E, the voltage V1 can be calculated by the following formula:

$$V1=(R21+R.1+R22+R.2)\times E/(R11+R.1+R12+R.2+R21+R.1+R22+R.2)$$

Although the external forces R.1 and R.2 are different, the sum of R.1 and R.2 are included in the numerator and the denominator and at least the resistance R11, R12, R21, and R22 are equal. Therefore, the external forces R.1 and R.2 do not affect on the midpoint voltage V1.

The MREs 11, 12 and the MREs 21, 22 are provided in the different columns of the matrix. Therefore, the total magnetostriction affects on the first and the second columns are substantially equal even when the different amount of external forces 0.1 and 0.2 are applied. In other words, the magnetostriction affects on each MRE 11, 12, 21, 22 can be cancelled. As a result, the MRE bridge 50 can accurately output a signal corresponding to the direction of the bias magnetic field. The MRE bridges 51, 52, 53 have the same configuration as the MRE bridge 50.

Since the four MRE bridges 50 to 53 are formed on the substrate 55, the bridges 50 and 53 cannot be arranged adjacent to the centerline of the substrate 55. Even in such a case, an accurate position of the rotor 31 is determined based on a differential output calculated from the outputs of the bridges 50 to 53.

Figure 4:
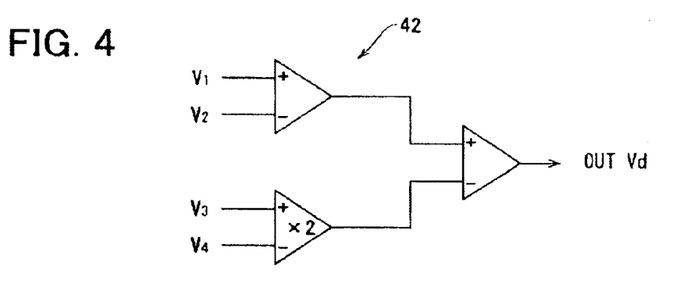
FIG. 4 is a circuit diagram showing the differential amplifier circuit.

Referring to FIG. 4, a differential amplifier circuit 42 includes three differential amplifiers. The circuit 42 performs multistage differential calculations from outputs V1, V3, V4, V2 of the bridges 50, 51, 52, 53, and produces a single differential output Vd. The output Vd is calculated by the following formula:

$$Vd=(V1-V2)-2\times(V3-V4)$$

An inverting input terminal and a non-inverting input terminal that used for the first stage differential calculation can be arranged the other way around. In that case, the output is calculated by the following formula:

$$Vd=(V2-V1)-2\times(V4-V3)$$

Figure 5:
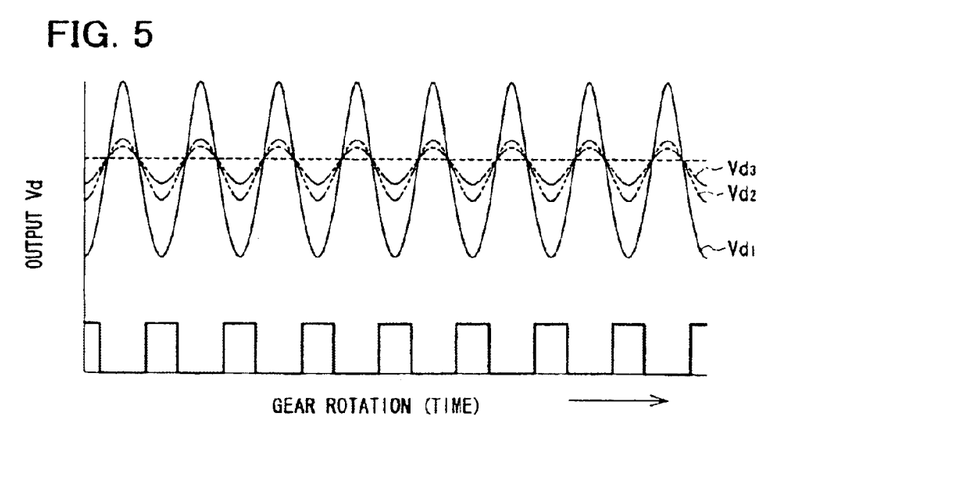
FIG. 5 is a time chart showing output waveforms of a differential amplifier circuit included in the position detecting device shown in FIG. 1.

FIG. 5 shows an output Vd of the differential amplifier circuit 42. Waveforms Vd1, Vd2, Vd3 show the output Vd measured when an air gap between the rotor 31 and the IC chip 40 is large, medium, and small, respectively. The output Vd decreases as the air gap becomes larger. However, the output Vd is approximately equal at the same rotor position regardless of the size of the air gap. In other words, minimum points of AG characteristic curves, indicated by dashed lines, are determined.

Figure 6:
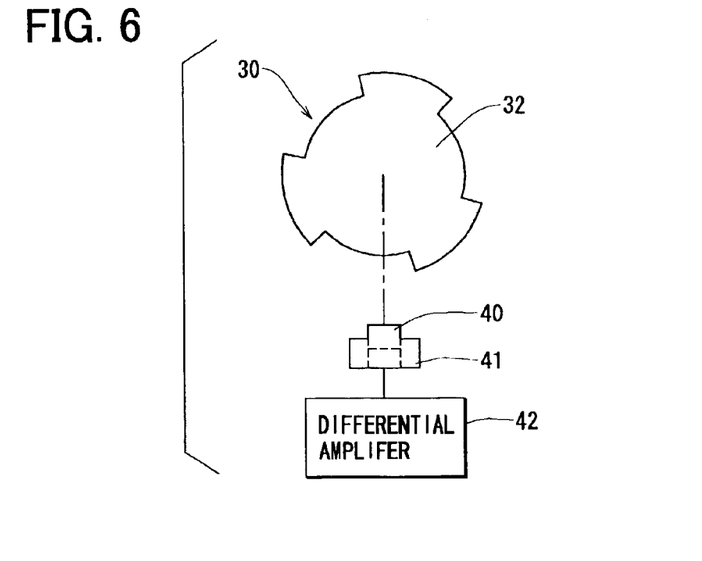
FIG. 6 is a schematic diagram of the position detecting device with a rotor having a different shape of gear-teeth from the rotor shown in FIG. 1.
Figure 7:
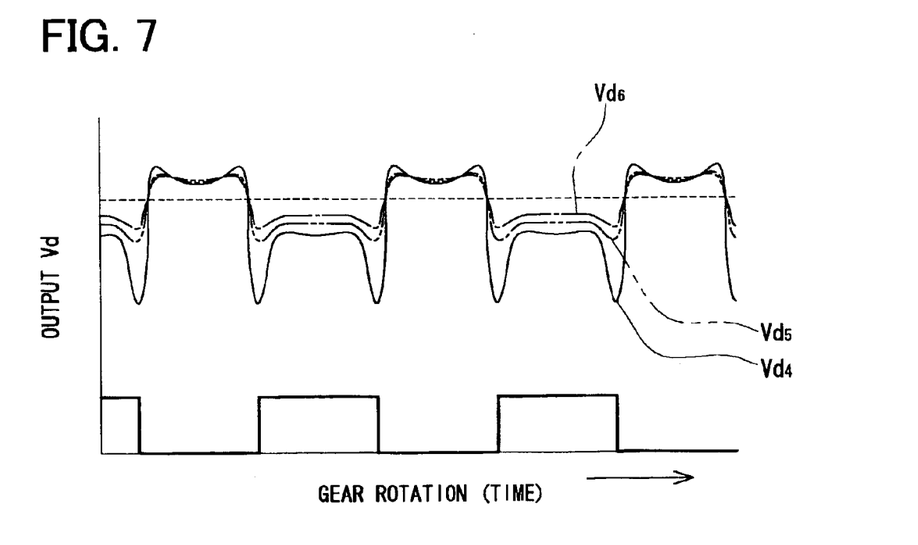
FIG. 7 is a time chart showing output waveforms of a differential amplifier circuit included in the position detecting device shown in FIG. 3.

Referring to FIG. 6, a rotor 32 has fewer gear-teeth compared to the rotor 31, but each tooth is larger in the circumferential direction. Waveforms Vd4, Vd5, Vd6 in FIG. 7 show the output Vd according to the rotor 32 when the air gap is large, medium, and small, respectively. As shown in FIGS. 5 and 7, minimum points of AG characteristic curves of the rotor 32 are approximately equal to the minimum points of the rotor 31. The reason why the outputs, that is, the deflection angles of the magnetic field, are substantially constant at the minimum points will be discussed below.

Figure 8:
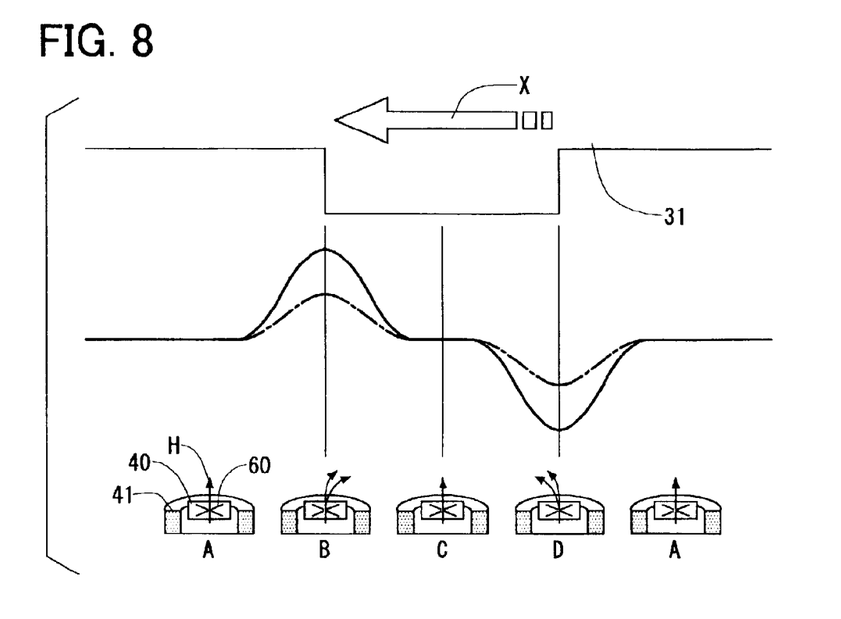
FIG. 8 is a time chart showing outputs of a MRD bridge, and a direction of magnetic lines of force.

FIG. 8 shows changing of the direction of magnetic lines H of force that pass through the IC chip 40 during rotation of the rotor 31, that is, changing of the deflection angle. Only one MRE bridge 60 is provided in the center of the IC chip 40 for explanatory purpose. Waveforms in a solid line and a one-dot chain line lines indicate outputs of the MRE bridge 60 when the air gap is small and large, respectively. Since four MRE bridges 50, 51, 52, 53 are arranged off center in this embodiment, outputs of the bridges 50, 51, 52, 53 may differ from the waveforms shown in FIG. 8.

The rotor 31 rotates in the direction indicated by an arrow X. The output of the MRE bridge 60 increases when the magnetic field is deflected to right and it decreases when the magnetic field is deflected to left. When the MRE bridge 60 faces a valley between the gear-teeth (position A), the magnetic lines H produced by the bias magnet 41 travel straight toward the gap. Thus, the output Vd is in the middle of the range.

When the gear position changes from the valley to the next tooth (position B), the magnetic lines H travel toward the center of the tooth, that is, curving to the right side of FIG. 8. The curve of the magnetic lines H becomes larger as the air gap becomes smaller. Two arrows at the position B indicate the magnetic lines H in the case of two different sizes of air gaps. At the position B, the curve of the magnetic lines H becomes at maximum. Therefore, the output Vd becomes at maximum.

When the gear position changes to the center of the tooth (position C), the magnetic lines H travel straight toward the tooth. Thus, the output Vd is in the middle of the range. When the gear position changes from the tooth to the next valley (position D), the magnetic lines H travel toward the center of the tooth, that is, curving to the left side of FIG. 8. The curve of the magnetic lines H becomes larger as the air gap becomes smaller. Therefore, the curve of the magnetic line H becomes at maximum at the position D. As a result, the output Vd becomes at minimum.

Figure 14A:
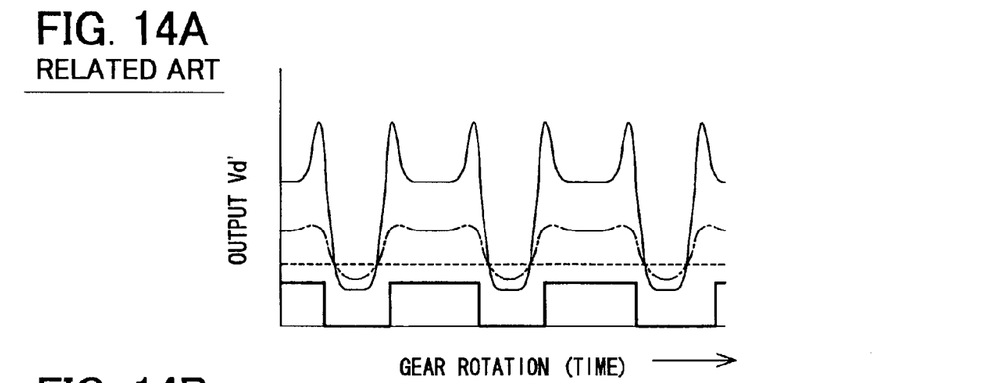
FIG. 14A is a time chart showing output waveforms of a differential amplifier circuit included in the position detecting device of the related art.
Figure 14B:
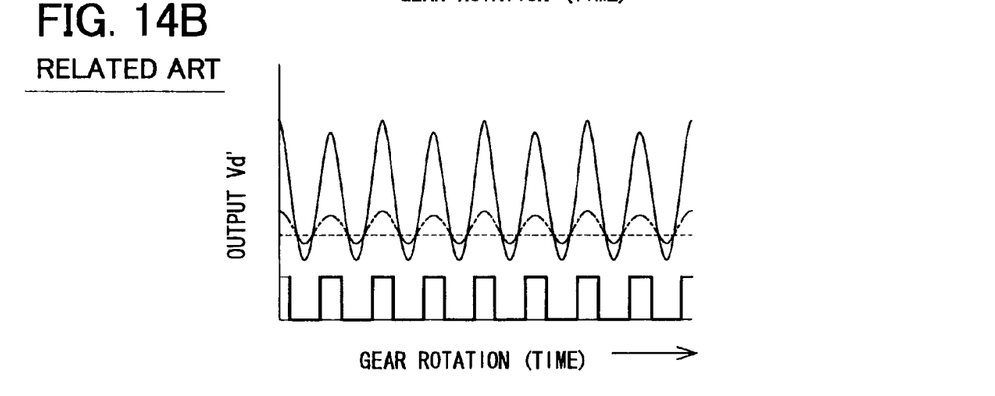
FIG. 14B is a time chart showing output waveforms of the differential amplifier circuit included in the position detecting device of the related art.

The MRE bridges 6, 16 of the related art shown in FIG. 13 basically produce outputs similar to the MRE bridge 60. Outputs Vd' of the differential amplifier circuit 20 are shown in FIGS. 14A and 14B for each case that the air gap is small or large, and for different shapes of gear-teeth. The outputs of the MRE bridges 6, 16 in the case of small air gap and the differential output between the MRE bridges 6, 16 are shown in FIG. 15.

A minimum point Pa of the AG characteristic curve is also indicated in FIG. 15. The minimum point Pa is a differential output between an extreme point Pe of the MRE bridge 6 and an inflection point Pi of the MRE bridge 16. The extreme point Pe refers to a point that the output of the differential amplifier is at maximum or minimum. The inflection point Pi refers to a point that the rate of change in gradient of the output curve of the differential amplifier circuit 20 turns from increase to decrease or from decrease to increase.

In the device 1, the minimum point Pa of the AG characteristic curve is determined based on the differential output between the extreme point Pe of the MRE bridge 6 and the inflection point Pi of the MRE bridge 16. The extreme point Pe of the MRE bridge 6 is determined by a size of the air gap and a switching point between the valley and the tooth of the gear. The size of the tooth does not affect the determination of the extreme point Pe.

The inflection point Pi of the MRE bridge 16 is determined by the size of the air gap, an edge of the tooth, and the size of the tooth. More specifically, the output around the inflection point Pi is obtained when the gear turns a certain degree from an edge of the tooth or a certain degree to the other edge of the tooth. In other words, the position of the edge affects on the determination of the infection point Pi.

Furthermore, the size of the gear-teeth affects the determination because the angle between the edge and the inflection point Pi changes as the size of the gear-teeth changes. As a result, the differential output between the extreme point Pe and the inflection point Pi changes as the size of the gear-teeth changes. That is, the minimum point Pa of the AG characteristic curve differs according to shapes of the gear-teeth.

Figure 9:
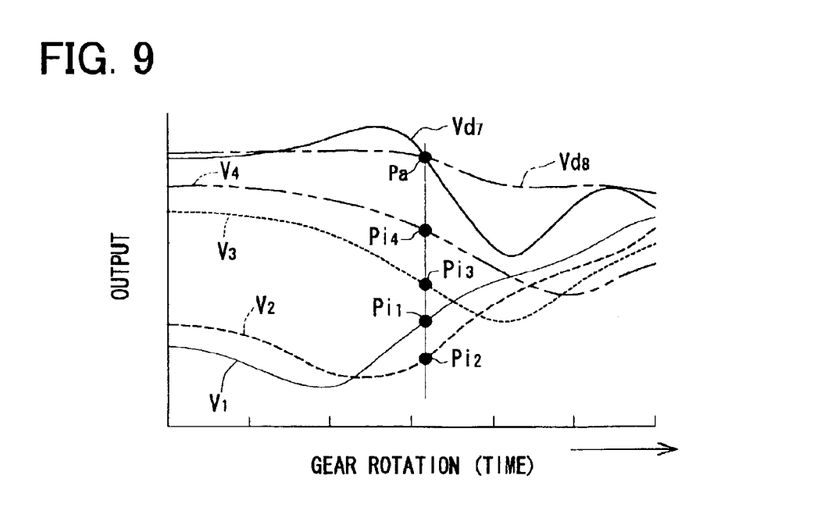
FIG. 9 is a time chart showing outputs of the MRD bridges and the differential amplifier.

To solve this problem, four MRE bridges 50, 51, 52, 53 are provided as shown in FIG. 2, and a single differential output Vd is obtained by multistage differential calculations from the outputs V1, V2, V3, V4. By doing so, the deflection angle at the minimum point Pa of the AG characteristic curve becomes constant irrespective of shapes of the gear-teeth. The output Vd at the minimum point Pa of the AG characteristic curve is obtained based on the outputs V1, V2, V3, V4 at or around inflection points Pi1, Pi2, Pi3, Pi4 as shown in FIG. 9. FIG. 9 shows the outputs V1 to V4 in the case of small air gap.

Unlike the device 1, the device 30 does not use the outputs V1 to V4 at the extreme points. Therefore, the output Vd at the minimum point Pa of the AG characteristic curve remains constant regardless of shapes of gear-teeth of the rotors 31 and 32. By binarizing the outputs Vd of the differential amplifier circuit 42 with a threshold determined based on the output Vd at the minimum point Pa, the gear positions of the rotors 31 and 32 can be accurately determined. As a result, it is not necessary to provide different position detecting circuits for rotors having different shapes of gear-teeth.

[Second Embodiment]

Figure 10:
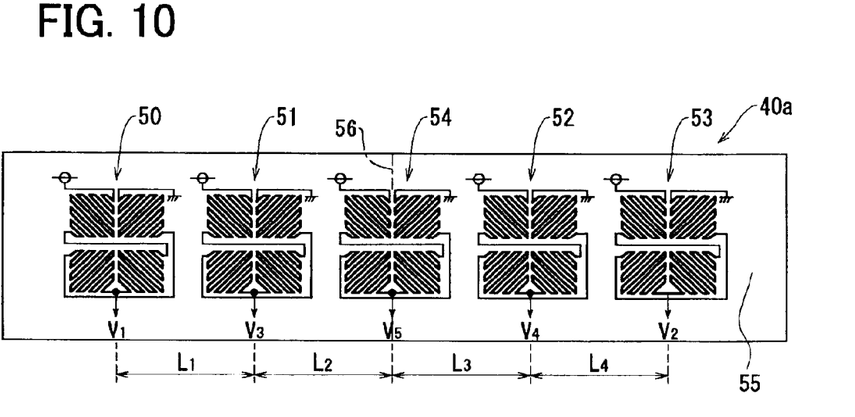
FIG. 10 is a schematic diagram showing an IC chip included in a position detecting device according to the second embodiment.

Referring to FIG. 10, the IC chip 40a includes five MRE bridges 50, 51, 52, 53, 54 on the substrate 55. A part of the IC chip 40a is placed in the hole of the bias magnet 41 at the potion that the centerline 56 of the substrate 55 matches the central axis of the bias magnet 41. The MRE bridges 50 and 53 are arranged symmetric with respect to the centerline 56. The MRE bridges 51 and 52 are arranged symmetric with respect to the centerline 56 and the middle points between the MRE bridge 50 and centerline 56 and between the MRE bridge 53 and the centerline 56, respectively. The MRE bridge 54 is arranged so that its centerline is on the centerline 56. Thus, the distances L1 to L4 between each of the MRE bridges 50 to 53 are all equal (L1=L2=L3=L4).

Figure 11:
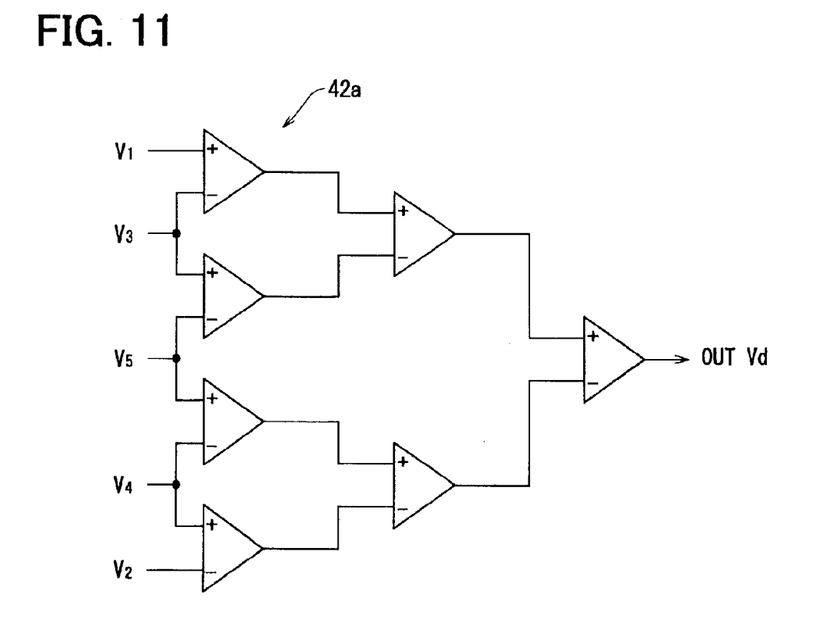
FIG. 11 is a circuit diagram showing a differential amplifier circuit included in the position detecting device according to the second embodiment.

Referring to FIG. 11, the differential amplifier circuit 42a includes seven differential amplifiers. The circuit 42a performs three-stage differential calculations from the outputs V1 to V5 produced by the MRE bridges 50 to 54. The three-stage differential calculations are performed by the following formula:

$$Vd=\{(V1-V3)-(V3-V5)\}-\{(V5-V4)-(V4-V2)\}$$

The inverting input and the non-inverting input can be provided the other way around. In that case, the following formula is used:

$$Vd=\{(V5-V4)-(V4-V2)\}-\{(V1-V3)-(V3-V5)\}$$

With this configuration, the positions of the rotors 31, 32 are accurately determined in the same manner as the first embodiment.

[Other Embodiment]

Figure 12:
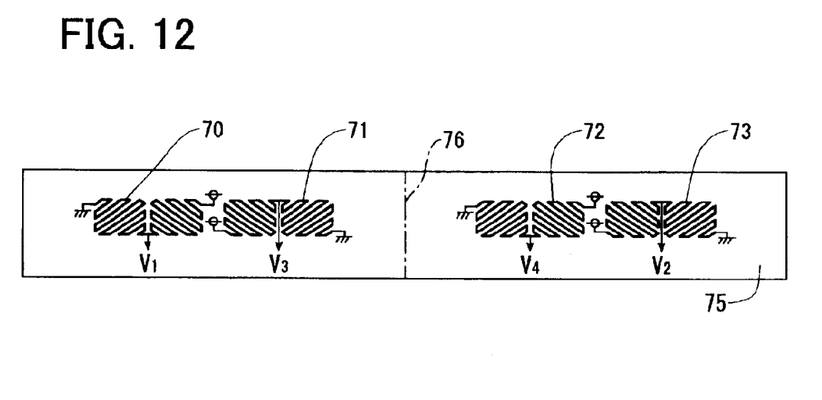
FIG. 12 is a schematic diagram showing a modified IC chip of the second embodiment.

Referring to FIG. 12, each MRE bridge 70, 71, 72, 73 is constructed by two MREs. Each MRE on the power source side and the one on the ground side are arranged symmetric with respect to a centerline 76 of a substrate 75. Therefore, the outputs V1 and V2, and the outputs V3 and V4 are equally affected by the magnetic distortion. The magnetic distortion affect can be canceled by the differential calculation.

The present invention should not be limited to the disclosed embodiments and modifications, but should cover other variations which may be attained without departing from the spirit of the invention. For example, the bias magnet can be in a solid cylinder shape or a rectangular parallelepiped shape.

What is claimed is:

1. A position detecting device comprising:
   a rotor having gear-teeth around an outer periphery thereof;
   a bias magnet for projecting a bias magnetic field toward the gear-teeth;
   a magnetic sensor having at least first, second, third, and fourth magnetoresistive element bridges arranged between the rotor and the bias magnet, wherein the magnetoresistive element bridges produce outputs that vary according to a direction of the bias magnetic field; and
   a differential output calculation means that performs a multistage differential calculation from the outputs of the magnetoresistive element bridges and obtains a single differential output,
   wherein the first and the second bridges are positioned symmetric to a magnetic axis of the bias magnet, the third bridge is positioned at a midpoint between the first bridge and the magnetic axis, and the fourth bridge is positioned at a midpoint between the second bridge and the magnetic axis.

2. The position detecting device according to claim 1, wherein:
   the magnetic sensor has the first, the second, the third, and the fourth magnetoresistive element bridges;
   the differential output calculation means receives the outputs of the first, the second, the third, and the fourth bridges indicated in V1, V2, V3, V4; and
   the differential output calculation means calculates a differential output Vd by a formula Vd=(V1−V2)−2(V3−V4).

3. The position detecting device according to claim 1, wherein:
   the magnetic sensor has the first, the second, the third, and the fourth magnetoresistive element bridges;
   the differential output calculation means receives the outputs of the first, the second, the third, and the fourth bridges indicated in V1, V2, V3, V4; and
   the differential output calculation means calculates a differential output Vd by a formula Vd=(V2−V1)−2(V4−V3).

4. The position detecting device according to claim 1, further comprising a fifth magnetoresistive element bridge arranged on the magnetic axis of the bias magnet.

5. The position detecting device according to claim 4, wherein:
   the differential output calculation means receives the outputs of the first, the second, the third, the fourth, and the fifth bridges indicated in V1, V2, V3, V4, V5; and
   the differential output calculation means calculates a differential output Vd by a formula Vd={(V1−V3)−(V3−V5)}−{(V5−V4)−(V4−V2)}.

6. The position detecting device according to claim 4, wherein:
   the differential output calculation means receives the outputs of the first, the second, the third, the fourth, and the fifth bridges indicated in V1, V2, V3, V4, V5; and
   the differential output calculation means calculates a differential output Vd by a formula Vd={(V5−V4)−(V4−V2)}−{(V1−V3)−(V3−V5)}.

7. The position detecting device according to claim 1, wherein:
   each magnetoresistive element bridge comprises first, second, third, and fourth magnetoresistive elements disposed in matrix, columns of which are parallel to the magnetic axis of the bias magnet;
   the first and the second magnetoresistive elements are located in different columns of the matrix;
   the third and the fourth magnetoresistive elements are located in different columns of the matrix;
   each magnetoresistive element is arranged so that a sensing axis thereof is substantially forty-five degrees with respect to the magnetic axis of the bias magnet;
   the sensing axis of the first and the second magnetoresistive elements is orthogonal to the sensing axis of the third and the fourth magnetoresistive elements;

the magnetoresistive elements are connected in series in an order of the first, second, third, and fourth magnetoresistive elements;

each magnetoresistive bridge produces an output that varies according to changes in resistance of the magnetoresistive elements, the output is measured at a connecting point between the second and the third magnetoresistive elements.

* * * * *